US007007988B1

(12) United States Patent  
Doyle

(10) Patent No.: US 7,007,988 B1
(45) Date of Patent: Mar. 7, 2006

(54) TRAILER PROTECTIVE APPARATUS

(76) Inventor: John F. Doyle, 8868 Oak Meadow Dr. Unit 33, Saginaw, MI (US) 48609

( * ) Notice: Subject to any disclaimer, the term of this patent is extended or adjusted under 35 U.S.C. 154(b) by 0 days.

(21) Appl. No.: 11/123,433

(22) Filed: May 6, 2005

(51) Int. Cl.
B60R 19/02 (2006.01)

(52) U.S. Cl. .................. 293/102; 296/182.1; 267/139; 49/462

(58) Field of Classification Search .............. 267/139, 267/140; 293/102, 1; 49/462; 296/207, 296/182.1; 52/211; D8/402, 403, 395
See application file for complete search history.

(56) References Cited

U.S. PATENT DOCUMENTS

| 3,110,066 A | | 11/1963 | Ward et al. |
| 4,768,320 A | * | 9/1988 | Weller .......................... 52/211 |
| D302,939 S | | 8/1989 | Ruskin |
| 5,488,804 A | * | 2/1996 | Batscher ....................... 49/462 |
| D379,298 S | | 5/1997 | Bowen et al. |
| 5,639,072 A | * | 6/1997 | McCall ........................ 267/139 |
| 5,732,442 A | | 3/1998 | Haggard |
| 6,357,187 B1 | | 3/2002 | Haldeman |
| 2003/0197105 A1 | | 10/2003 | Murray |

FOREIGN PATENT DOCUMENTS

GB 2037932 A * 7/1980

* cited by examiner

Primary Examiner—Jason Morrow
(74) Attorney, Agent, or Firm—John K. McCulloch

(57) ABSTRACT

Apparatus for protecting a door and rear sill of a trailer comprises a U-shaped body formed of resilient, rubbery material having a web from which two arms extend, the arms being spaced apart a distance sufficient to straddle a sidewall of the trailer. The arms of the body also may embrace not only a sidewall of the trailer but also an adjacent door which occupies a position alongside and parallel such trailer sidewall. The protective body also has a depending lip which projects downwardly from the web a distance to overlap at least a part of the trailer floor sill.

17 Claims, 2 Drawing Sheets

TRAILER PROTECTIVE APPARATUS

This invention relates to apparatus adapted for removable coupling to a trailer for protecting the rear end of the trailer and its side walls and doors from being damaged by backing the trailer into a loading dock.

BACKGROUND OF THE INVENTION

Cargo-carrying trailers conventionally have ground engageable wheels supporting a trailer body having a front wall, opposed sidewalls, a top wall, and a floor terminating at the rear in a sill. Some trailers have doors hinged at the rear of the trailer sidewalls for swinging movements about a vertical axis between closed and opened positions. In their opened positions the doors preferably lie alongside and parallel to the trailer sidewalls. Preferably, the doors are latched in their opened positions, but sometimes the latches are inoperable or are not used for one reason or another. In any event, when a trailer is backed toward a loading dock the rear end of the trailer is not always perfectly parallel to the forward surface of the dock. In some cases, therefore, one edge of the rear end of the trailer strikes the dock. In some instances the force with which the dock is struck causes damage to a trailer door, its floor, or its sill, or to the dock itself.

A principal object of the invention is to provide protective apparatus which overcomes or greatly minimizes the undesirable characteristics referred to above.

SUMMARY OF THE INVENTION

Apparatus constructed in accordance with the invention is adapted for use with a trailer of the kind having a cargo-carrying floor from which spaced apart, upstanding sidewalls extend. At the rear of the floor is a sill. At each of the sidewalls is hingedly mounted a door which is swingable about a vertical axis from a closed position substantially normal to the trailer sidewall to an open position in which the door lies alongside and substantially parallel to the sidewall on which it is mounted. This exposes the rear of the sidewall and the adjacent edge of the door, as well as the sill, to the possibility of damage in the event the trailer rear end is not parallel to the forward surface of a loading dock and strikes the loading dock with sufficient force to damage the trailer sidewall, the door, or the sill.

The protective apparatus comprises a resilient, substantially U-shaped body having a pair of spaced apart arms joined at corresponding ends by a transverse web, the opposite ends of the arms being free. The web includes a lip which projects downwardly beyond the lower edges of the body arms.

The protective body may be applied to a trailer when the door adjacent one sidewall of the trailer is open and in a position alongside the sidewall. Application of the protective device is achieved by applying the device to the sidewall and the open door so that the arms of the device straddle the sidewall and the door. The spacing between the arms of the protective device should be such that, when the arms straddle the sidewall and the door, the sidewall and the door will be resiliently clamped by the arms of the protective device, thereby enabling the arms to exert a yieldable force on the door and maintain it in its open position alongside the sidewall to which it is attached.

The application of the protective device to the trailer should be such as to enable the lower edge of one of the arms to rest upon the upper surface of the trailer floor, thereby enabling the downwardly extending lip to overlap the sill and provide a yieldable cushion that will lie between the trailer sill and the dock when the trailer is in a loading or unloading position at the dock.

Since the engagement of a trailer with a dock can generate significant forces, the protective device should be sufficiently thick and formed of a material which is sufficiently compressible or deformable to absorb substantial force. This necessarily will increase the weight of the protective device. To minimize the weight, while still having a lip sufficiently thick to perform its protective function, the web of the device may be provided with one or more weight-reducing openings.

THE DRAWINGS

The preferred embodiment of the invention is illustrated in the accompanying drawings wherein.

THE PREFERRED EMBODIMENT

Figure 1:
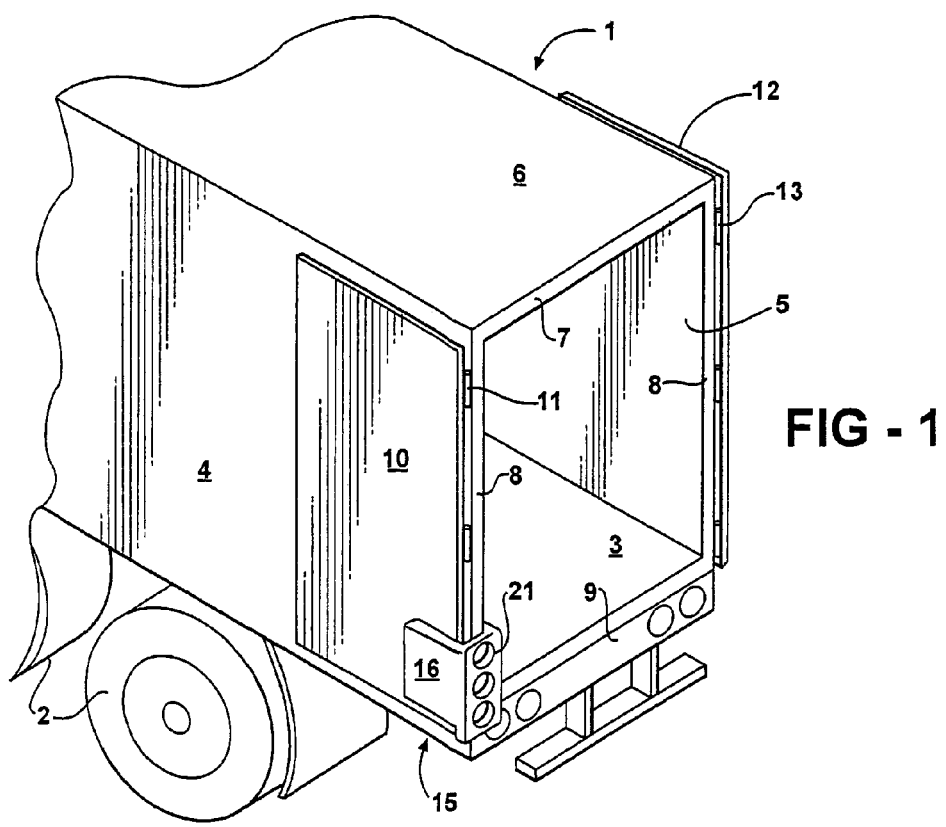
FIG. 1 is a fragmentary, isometric view of a trailer having its doors in an open position and with a protective device attached to the rear of trailer and at one side thereof.
Figure 2:
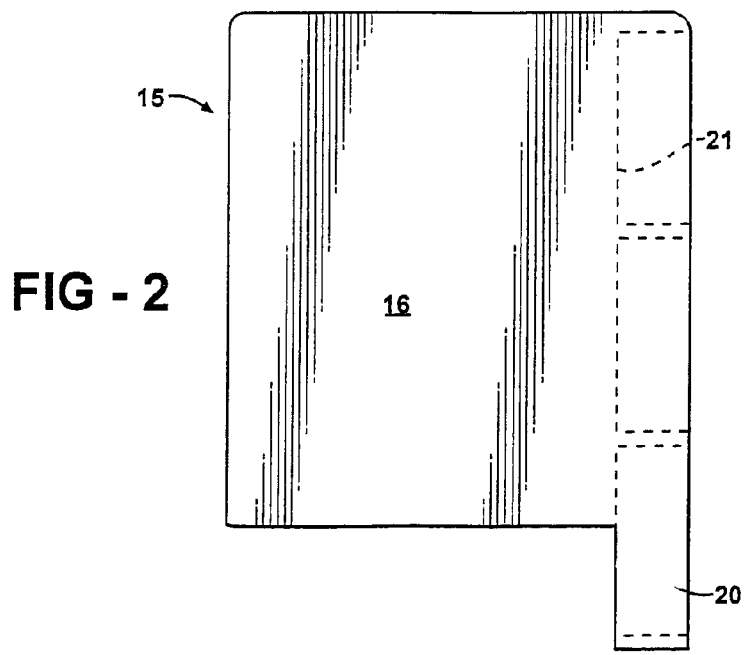
FIG. 2 is an enlarged, side elevational view of the protective device.
Figure 3:
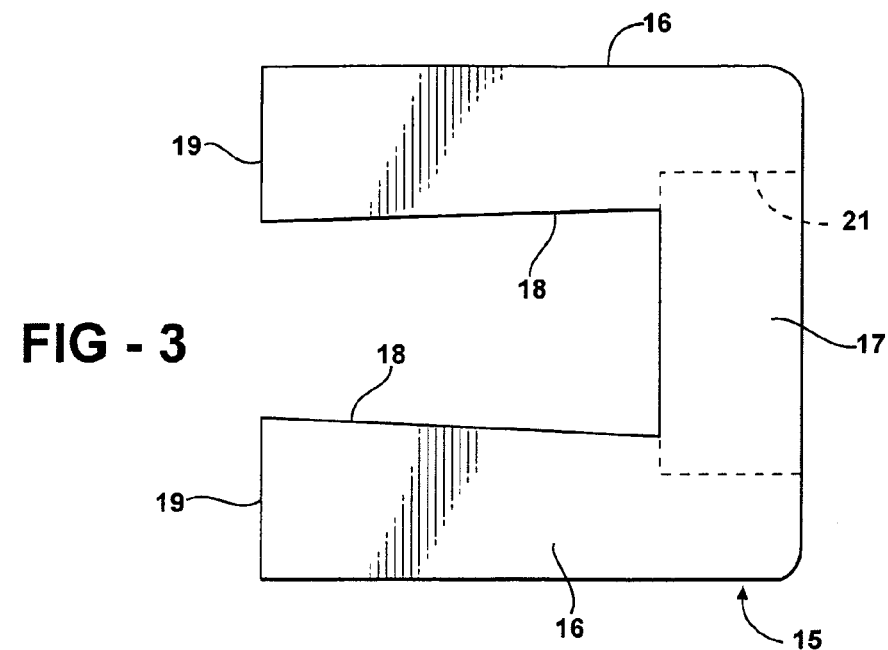
FIG. 3 is a top plan view of the device.
Figure 4:
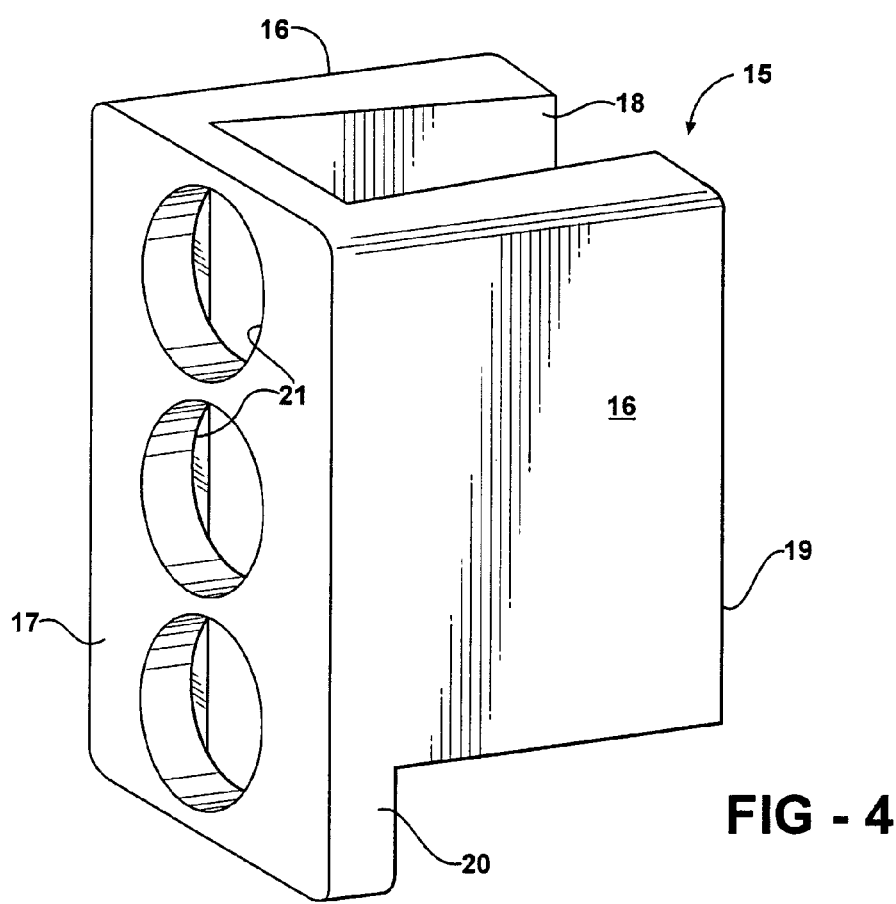
FIG. 4 is an isometric view, on an enlarged scale, of the protective device shown in FIG. 1.

Apparatus constructed in accordance with the presently preferred embodiment of the invention is adapted for use in conjunction with a conventional trailer 1 having a frame supported by ground engageable wheels 2. The frame supports a cargo-carrying floor 3 from which spaced sidewalls 4 and 5 extend upwardly and are spanned at their upper ends by a top wall 6. The rear of the trailer has a doorway formed by frame members 7 and 8 and a sill 9 at the rear of the floor 3. A door 10 which extends the full height of the doorway is mounted by hinges 11 to the frame 8 for swinging movements about a vertical axis. A similar door 12 is coupled by hinges 13 to the door frame 8 for similar swinging movements. In their closed positions, the doors 10 and 12 close the doorway. Each door may be swung from a closed position through about 270° to an open position in which it lies alongside and substantially parallel to the adjacent sidewall 4 or 5. Conventionally, latches (not shown) are provided to maintain the doors in their open positions.

The protective apparatus comprises, preferably, a pair of identical U-shaped body members 15 one of which is shown in FIG. 1. Each body member has a pair of arms 16 which project in the same direction from a web 17 which spans and joins corresponding ends of the arms. Each of the arms 16 has a free end 19 and an inner surface 18. The surfaces 18 converge in a direction toward the free ends 19 of the arms. The web 17 has a lip 20 which extends downwardly from the lower edge of the arms 16 and for the full width of the body. The lip is integral with the remainder of the body.

The protective body 15 is formed of resilient, rubbery material such as neoprene or any other material having the requisite properties of resiliency, compressibility or deformability, and durability. It is preferred to reduce the overall weight of the body by the provision of one or more openings 21 in the web and, if desired, such an opening also may extend through the lip 20.

To condition the protective apparatus for use the doors 10 and 12 of the trailer are swung to the open positions lying alongside the respective sidewalls 4 and 5 of the trailer. The protective device then may be applied to the rear of the trailer, as indicated in FIG. 1, so that the arms 16 straddle and embrace the sidewall and the adjacent door 10, with the lower edge of the inboard arm 16 resting on the trailer floor 3 and with the lip 20 extending below the floor and overlapping at least a portion of the sill 9.

Because of the tapered configuration of the arms 16 and the resiliency of the material from which the body 15 is formed the body not only may accommodate trailer doors and sidewalls of different thicknesses, but also will apply a yieldable force on the associated trailer door to maintain it in its parallel position alongside the adjacent outer sidewall of the trailer.

When a trailer equipped with a protective body is backed toward a loading dock, the protective device will engage the dock first and thereby protect the associated trailer door and the sill 9 against damage.

Although it is preferred to use two protective devices, one at each side of the trailer, only one protective body is illustrated in FIG. 1. The second protective body, if used, will be positioned at the right-hand side of the trailer in the same manner as the protective body shown.

There are some trailers which do not have doors swingable about vertical axes. For example, some trailers have doors which move vertically between open and closed positions. Still other trailers have no rear doors at all. However, such trailers do have floors and sills. The protective apparatus disclosed herein may be used with such trailers inasmuch as the spacing between the arms 16 of the body is sufficient to accommodate a sidewall of a trailer which is not equipped with doors of the kind illustrated at 10 and 12.

The disclosed embodiment is representative of a presently preferred form of the invention, but is intended to be illustrative rather than definitive thereof. The invention is defined in the claims.

I claim:

1. Protective apparatus for use with a trailer having a rear end, at least one sidewall, a floor, and a sill at floor level at the rear end of said trailer, said apparatus comprising a body having a pair of arms spaced from one another a distance sufficient to straddle and embrace said sidewall at said rear end of said trailer, said body having a lip spanning said arms of said body and depending therefrom a distance sufficient to overlap said sill when said body arms embrace said sidewall and one of said arms bears on said floor.

2. The apparatus according to claim 1 wherein said lip is formed of resilient, cushioning material.

3. The apparatus according to claim 1 wherein corresponding ends of said arms are free.

4. The apparatus according to claim 1 wherein said trailer includes a door adjacent said sidewall swingable about a substantially vertical axis at the rear end of said trailer from a first position in which said door is substantially normal to said sidewall to a second position adjacent and substantially parallel to said sidewall, said arms of said body being spaced apart a distance sufficient to straddle said sidewall and said door.

5. The apparatus according to claim 4 wherein said arms of said body are resilient thereby enabling said walls to apply to said sidewall and said door a yieldable force tending to maintain said door in said second position.

6. The apparatus accordant to claim 1 wherein said body has a web joining said arms at corresponding ends thereof.

7. The apparatus according to claim 6 wherein said web has at least one opening therein.

8. The apparatus according to claim 6 wherein said web has a plurality of openings therein.

9. The apparatus according to claim 1 wherein said lip has an opening therein.

10. The combination of a trailer having a rear end, a pair of spaced sidewalls, a floor spanning said sidewalls, a sill at floor level at the rear end of said trailer; and a protective device for protecting said sill against engagement with a dock rearwardly of the trailer, said protective device comprising a body having a pair of arms between which said side wall is accommodated, one of said arms being seated on said floor, and a lip depending from said body and extending beyond said arms a sufficient distance to overlap said sill and prevent engagement between said sill and said dock.

11. The combination according to claim 10 wherein said trailer has at least one door pivoted to said sidewall at the rear of said trailer for swinging movements from a first position in which said door extends substantially normal to said sidewall to a second position in which said door is substantially parallel to said side wall.

12. The combination according to claim 11 wherein said door when in said second position is external of said sidewall.

13. The combination according to claim 11 wherein said arms of said body are resilient and exert a yieldable force on said door to maintain said door in said second position.

14. The combination according to claim 13 wherein corresponding ends of said arms are free.

15. The combination according to claim 10 wherein said body has a web spanning said arms and wherein said lip depends from said web.

16. The combination according to claim 15 wherein said lip has at least one opening therein.

17. The combination according to claim 15 wherein said lip depends from said arms.

* * * * *